(12) United States Patent
Derman

(10) Patent No.: US 11,686,285 B1
(45) Date of Patent: Jun. 27, 2023

(54) FRICTIONLESS SPINNING DEVICE

(71) Applicant: Jay S Derman, Carlsbad, CA (US)

(72) Inventor: Jay S Derman, Carlsbad, CA (US)

( * ) Notice: Subject to any disclaimer, the term of this patent is extended or adjusted under 35 U.S.C. 154(b) by 0 days.

(21) Appl. No.: 17/976,640

(22) Filed: Oct. 28, 2022

Related U.S. Application Data

(63) Continuation-in-part of application No. 17/838,040, filed on Jun. 10, 2022, now Pat. No. 11,519,551.

(60) Provisional application No. 63/273,994, filed on Oct. 31, 2021, provisional application No. 63/215,062, filed on Jun. 25, 2021.

(51) Int. Cl.
*F03D 3/00* (2006.01)
*F16C 32/04* (2006.01)

(52) U.S. Cl.
CPC .......... *F03D 3/005* (2013.01); *F16C 32/0427* (2013.01); *F05B 2240/213* (2013.01)

(58) Field of Classification Search
CPC . F03D 3/005; F05B 2240/213; F16C 32/0427
USPC .............................................. 248/341, 309.4
See application file for complete search history.

(56) References Cited

U.S. PATENT DOCUMENTS

| | | | |
|---|---|---|---|
| 7,381,030 B1* | 6/2008 | Vanderhye | F03D 3/005 416/169 R |
| 10,612,515 B2* | 4/2020 | Reyna | F03D 3/02 |
| 11,519,551 B1* | 12/2022 | Derman | F16B 1/00 |
| 11,549,485 B1* | 1/2023 | Plemmons | F03D 3/067 |
| 2009/0196763 A1* | 8/2009 | Jones | F03D 3/005 416/197 A |
| 2016/0312768 A1* | 10/2016 | Takakura | F03D 80/70 |
| 2021/0391778 A1* | 12/2021 | Pederson | H02K 21/222 |

* cited by examiner

*Primary Examiner* — Todd M Epps

(57) ABSTRACT

A spinning device includes a blade assembly including a hollow body, and a rod coupled to the hollow body and supported via a magnetic levitation assembly.

18 Claims, 6 Drawing Sheets

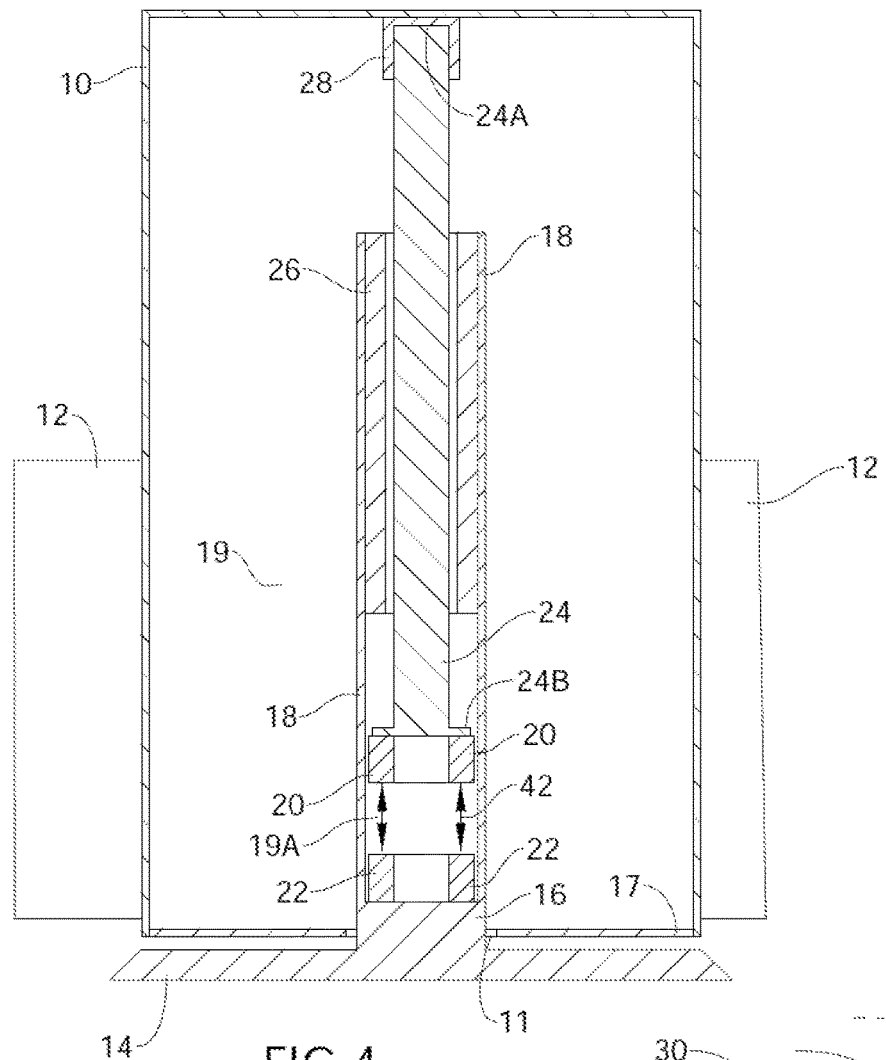
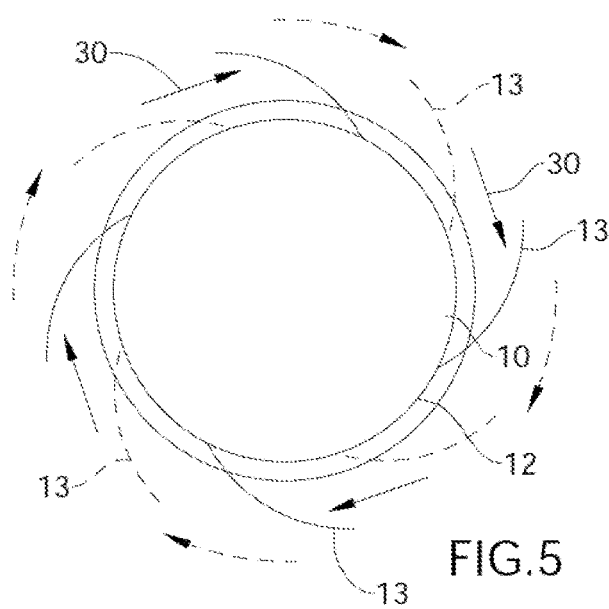

FRICTIONLESS SPINNING DEVICE

RELATED APPLICATION

This application claims benefit to U.S. Provisional Application No. 63/273,994 filed on Oct. 31, 2021 and is a Continuation-In-Part of U.S. Non-Provisional application Ser. No. 17/838,040 filed on Jun. 10, 2022 which claims benefit to U.S. Provisional Application No. 63/215,062 filed on Jun. 25, 2021, all of which are incorporated by reference herein in their entirety.

BACKGROUND

The present disclosure relates generally to spinning devices and systems.

Spinning devices may be used for a variety of different applications including, but not limited to toys, decorations, spinning hangers, turbines and the like. As such, an improved system for a spinning device is desirable.

SUMMARY

According to various embodiments, disclosed is a spinning device, comprising a wind blade assembly including a generally hollow body supporting plurality of blades; a rod configured to support the wind blade assembly; and a magnetic levitation assembly configured to support the rod. In certain embodiments, the hollow body comprises an upper wall and a side wall extending downwards from the upper wall and defining a hollow enclosure between a bottom surface of the upper wall and an inner surface of the side wall, wherein the rod is coupled to a center of the upper wall to provide a rotational axis for the wind blade assembly. In further embodiments, the plurality of blades are coupled to the side wall of the hollow body and are configured to cause the hollow body to spin via a torquing force applied to the blades. In yet further embodiments, the magnetic levitation assembly comprises an upper magnet coupled to the rod below the upper wall, and further comprises a lower magnet positioned below the upper magnet in repelling polarity to the upper magnet, wherein the magnetic levitation assembly further comprises a lower magnet positioned below the upper magnet in repelling polarity to the upper magnet, the magnetic levitation assembly being configured to levitate the rod and wind blade assembly via a repelling force between the upper magnet and the lower magnet.

In certain embodiments, the upper and lower magnets are disc rings. In some embodiments, the upper and lower magnets are neodymium magnets. In certain embodiments, the hollow body include a bottom wall extending inwardly from a bottom edge of the side wall. In certain embodiments, the hollow body is a cylindrical tube, drum, and/or can. In certain embodiments, the blades are a components of a blade belt that is attached to and extends around side wall of the hollow body. In certain embodiments, the blades are Savonius-type turbine blades. In certain embodiments, the spinning device may be a vertical wind turbine. In certain embodiments, the spinning device may be an amusement item. In certain embodiments, the spinning device may further comprise a stabilizing ring within the hollow body.

In further embodiments, the spinning device may comprise a retainer assembly configured to retain the rod in vertical alignment and in a levitated state, while allowing the rod to freely spin. In some embodiments, the retainer assembly is further configured to retain the upper and lower magnets in a repelling alignment. In certain embodiments, the retainer assembly includes a first tubular post which is opened at its top end and extends upwardly from a post base on which the lower magnet is supported, wherein the rod is engaged through the first tubular post such that it may move up and down as well as spin within the first tubular post.

In further embodiments, the spinning device may comprise a stop member extending radially outwards from the rod, the retainer assembly further comprising a block positioned above the stop member and configured to prevent the stop member from sliding upwards past the block, such that the rod is prevented from disassembling from the retainer assembly. In certain embodiments, the stop member comprises a disc extending radially outwards from a bottom or intermediate section of the rod, wherein the upper magnet is coupled to a bottom end of the disc. In some embodiments, the block comprises a second tubular post having a diameter smaller than the diameter of the first tubular post and nested within the first tubular post, wherein the rod fits snuggly within the second tubular post, and wherein a top surface of the disc is configured to hit against a bottom surface of the second tubular post as the rod is moved upwards, to prevent the disc from moving past the second tubular post. In other embodiments, the block comprises an upper post wall extending radially inwards from a side wall of the first tubular post, the upper post wall including an opening with a diameter larger than that of the rod, the upper wall further configured to hit against a top surface of the disc as the rod is moved upwards to prevent the disc from moving past the upper post wall. In further embodiments, the spinning device may include a second tubular post having a diameter smaller than the diameter of the first tubular post and nested within the first tubular post, wherein the second tubular post is supported on the post base, and wherein the lower magnet is supported atop the second tubular post, the second tubular post further comprising an opening through which the rod is engaged.

BRIEF DESCRIPTION OF THE FIGURES

The detailed description of some embodiments of the invention will be made below with reference to the accompanying figures, wherein the figures disclose one or more embodiments of the present invention.

FIG. 4 is a section view of the spinning device, taken along line 3-3 in FIG. 1.

FIG. 5 is a top view of the spinning device, illustrating spinning motion due to wind hitting the blades.

DETAILED DESCRIPTION OF CERTAIN EMBODIMENTS

Figure 1:
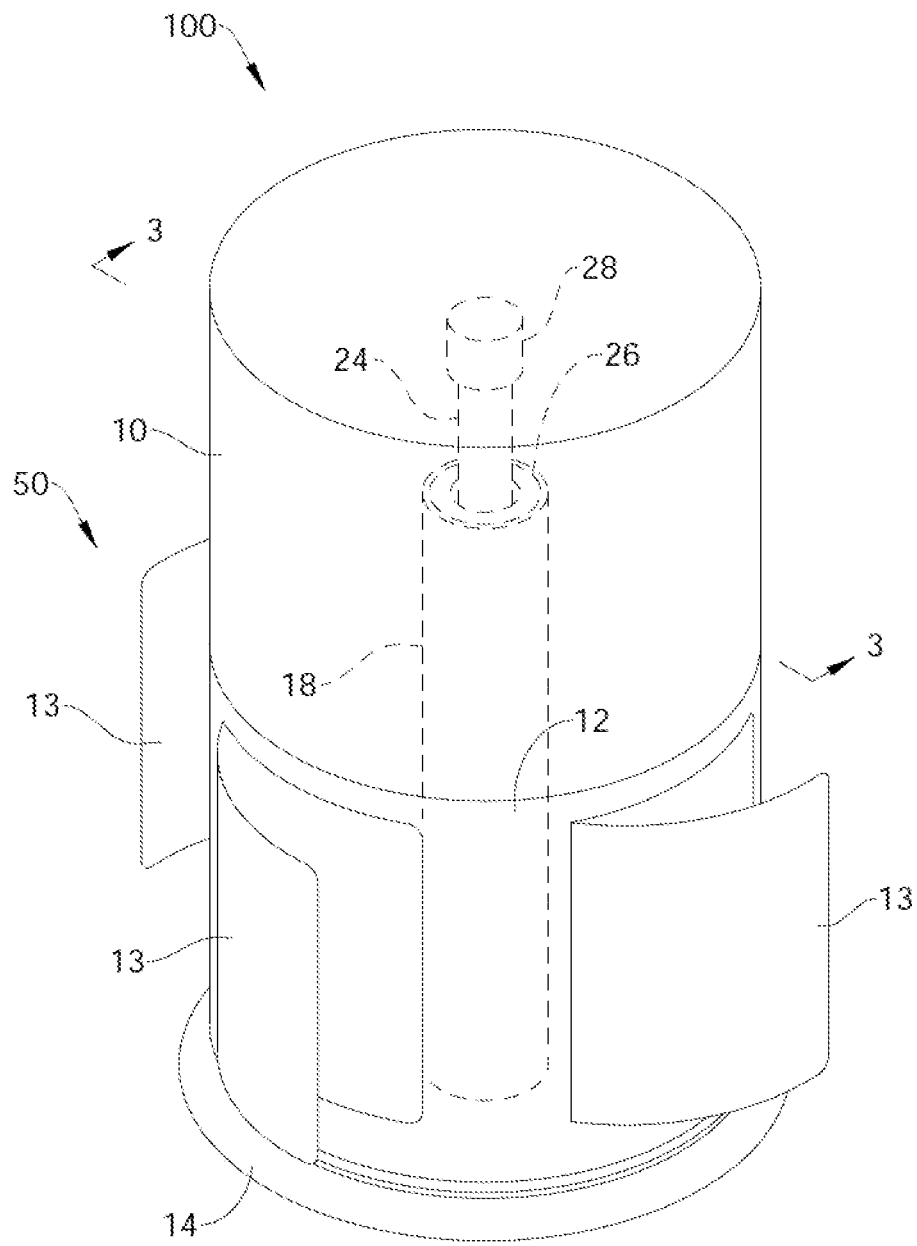
FIG. 1 is a perspective view of a spinning device comprising a wind blade assembly, in accordance with certain embodiments.
Figure 2:
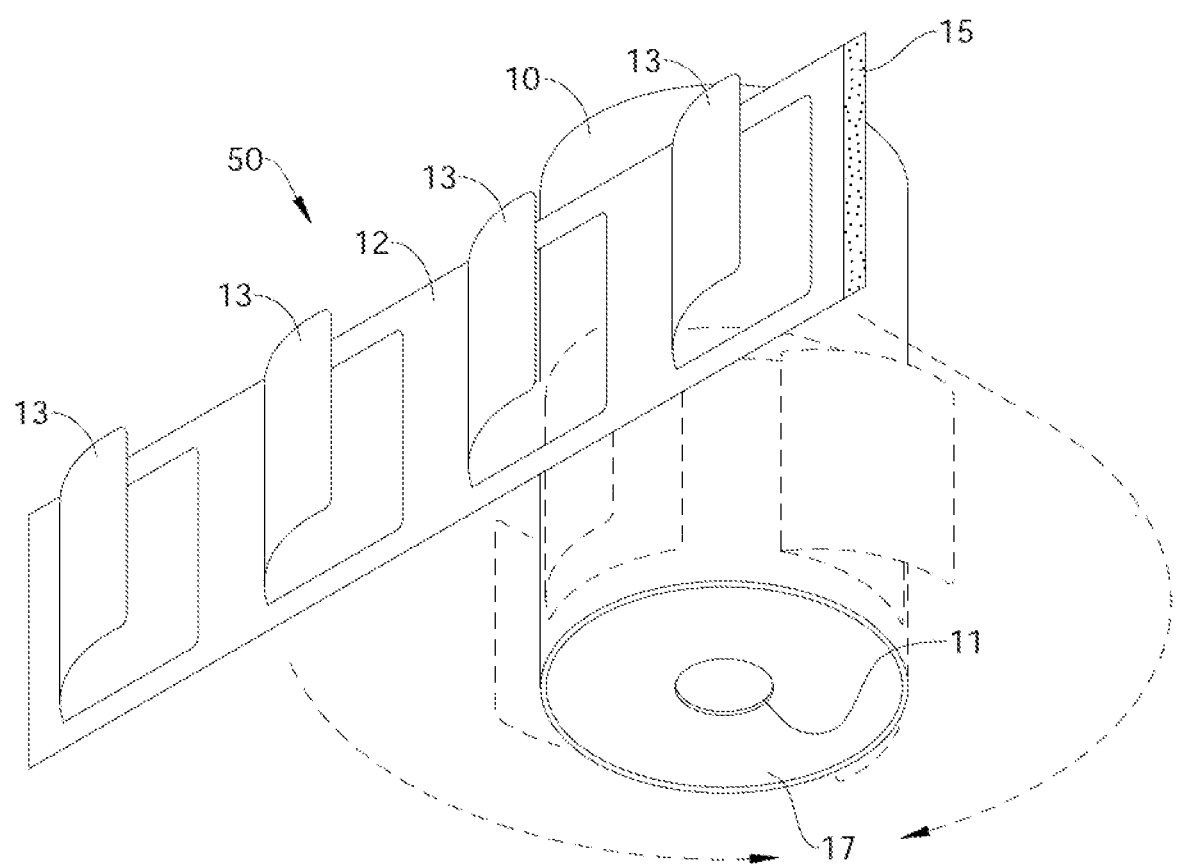
FIG. 2 is a bottom perspective exploded view of the wind blade assembly.

According to various embodiments as depicted in FIGS. 1-10, disclosed is a spinning device 100 generally comprising a wind blade assembly 50 supported on a shaft or rod 24 which in turn is supported on a magnetic levitation assembly that enables the rod 24 and thus the blade assembly 50 to spin with minimal frictional resistance. In embodiments, spinning device 100 may be used for harvesting wind energy (e.g., as a vertical turbine system). In other embodiments, spinning device 100 may be used as an amusement item, e.g., for decoration and/or incorporated within artwork, as a novelty item, toy and/or provided as a construction/hobby toy, and the like.

In certain embodiments, blade assembly 50 may comprise a generally hollow body 10 which supports a plurality of blades 13. Hollow body 10 may comprise a ceiling or upper wall 10A and side wall(s) 10B extending downwards from upper wall 10A to define a hollow enclosure between a bottom surface of upper wall and inner surface(s) of side wall(s) 10B. In certain embodiments, side wall(s) 10B is/are perpendicular to upper wall 10A, but not necessarily so. In embodiments, hollow body may be a generally symmetrical about an axis running through a center of upper wall 10A and perpendicular to upper wall 10A. In further embodiments, hollow body 10 may also include a bottom wall 17 extending inwardly from the bottom edge(s) of side wall(s) 10B, but not necessarily so. In certain embodiments as depicted in the figures, hollow body 10 may be a cylindrical tube, drum, can, an inverted container type object, and the like. In certain embodiments, upper wall 10A may be circular, but is not limited to this option. For example, upper wall 10A may take on the form of a triangular, square, or hexagon, and the like.

Blades 13 are generally configured to cause hollow body 10 to spin via a wind 30 or other torquing force applied to the blades. In one embodiment, blades 13 may be supported on and/or cut out from a blade belt 12 that extends around side wall(s) 10B and is attached to walls(s) 10B via adhesive 15 or other permanent or non-permanent attachment mechanism. In one embodiment, blade belt 12 may be detachable and reattachable, such that a user may reverse the direction of spin (see FIG. 8). In other embodiments, blades 13 may be cut out from side wall(s) 10B and/or attached directly to side wall(s) 10B. According to an exemplary embodiment, blade assembly 50 may comprise 4 blades 13. Additionally, blades 13 may be curved Savonius-type turbine blades as shown in the figures. It shall be appreciated however that any number of blades and/or various blade shapes may be used in alternate embodiments.

In certain embodiments as depicted in the figures, a top end 24A of rod 24 may be coupled to a bottom surface of upper wall 10A and is preferably centered about upper wall 10A. In some embodiments, a rod retaining cap 28 may be coupled to upper wall 10A and is configured to hold rod 24 in place. Furthermore, rod 24 is configured to magnetically levitate via a magnetic levitation assembly such that the rod and blade assembly are suspended in "floating" equilibrium.

According to various embodiments, the magnetic levitation assembly may generally comprise an upper magnet 20 to which rod 24 may be permanently attached, and a lower magnet 22 aligned in repelling/opposing polarity below upper magnet 20. In certain embodiment, upper and lower magnets 20, 22 may be neodymium magnets but are not limited to this option. In one embodiment, upper and lower magnets 20, 22 may be disc ring magnets as depicted in the figures. It shall be appreciated however that upper and lower magnets 20, 22 may be full discs, and/or have different geometric configurations in alternate embodiments. Additionally, upper and lower magnets 20, 22 may each comprise multiple magnets (e.g., multiple magnetic disc rings) that are magnetically attached.

Figure 6:
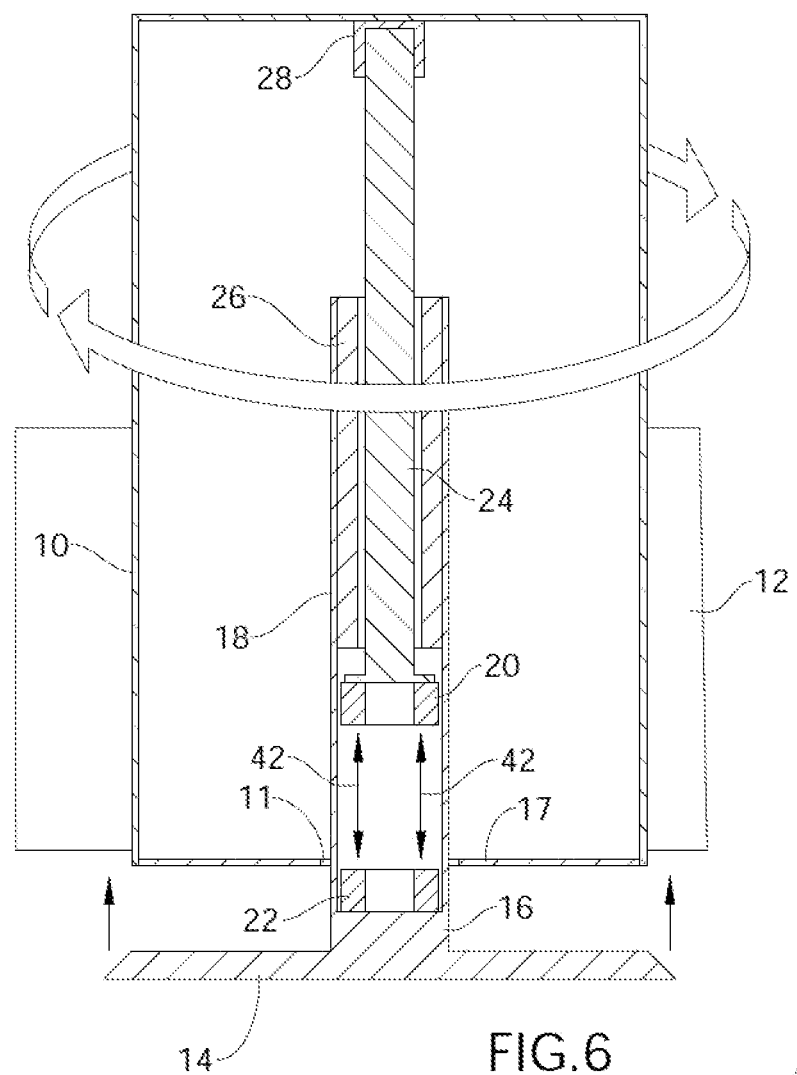
FIG. 6 is a section view of the spinning device, illustrating a slight lift and spinning of the hollow body due to wind.
Figure 7:
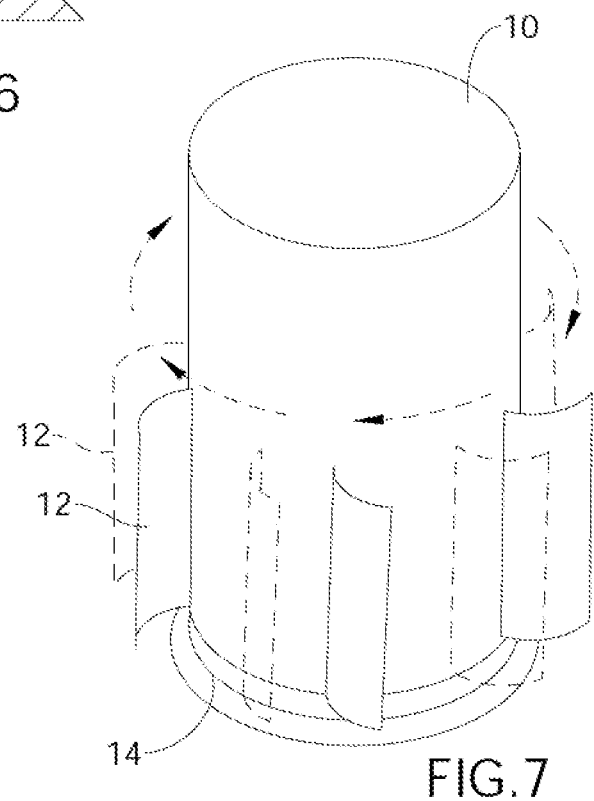
FIG. 7 is a perspective view of the spinning device, illustrating the spinning motion of the hollow body.
Figure 8:
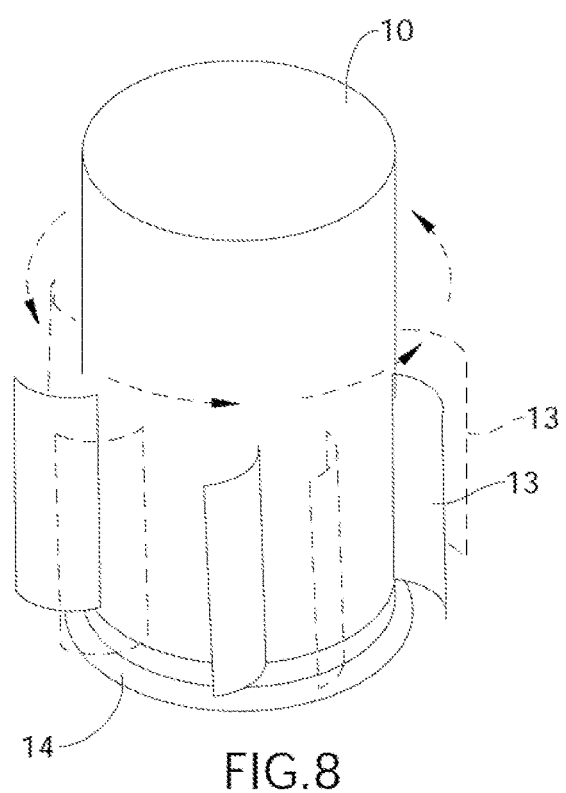
FIG. 8 is a perspective view of the spinning device showing the blade belt reversed for an opposite spin.

In certain embodiments, as best depicted in FIGS. 4 and 6, upper magnet 20 may be permanently coupled to a bottom end 24B of rod 24 (e.g., via an adhesive or magnetic element within bottom end 24B). In one embodiment, bottom end 24B may comprise a stop disc 24C with a diameter wider than that of rod 24. This may provide a greater surface area for attachment or bonding to upper magnet 20 and may further provide a mechanism for retaining the rod as will be described. Lower magnet 22 may be supported on and/or coupled to a post base 16 below upper magnet 20. In some embodiments, lower magnet 22 may be permanently attached to post base 16 (e.g., via adhesive or magnetic element within post base 16) to prevent it from flipping over, but not necessarily so. In some embodiments, post base 16 may be engaged through an opening 11 within bottom wall 17 of hollow body 10. In certain embodiments, the diameter of post base 16 may be slightly smaller than the diameter of opening 11. Furthermore, post base 16 may itself be supported on a wide support base 14 whose diameter is larger than the diameter of opening 11.

In certain embodiments, post base 16 and wide support base 14 may be components of a retainer assembly 19 configured to maintain a vertical alignment of the rod, and to further maintain a vertical and/or repelling alignment between the upper and lower magnets. This allows rod 24 to freely spin in a levitated state. Additionally, retainer assembly may further be configured to allow the rod to move up and down.

Figure 3:
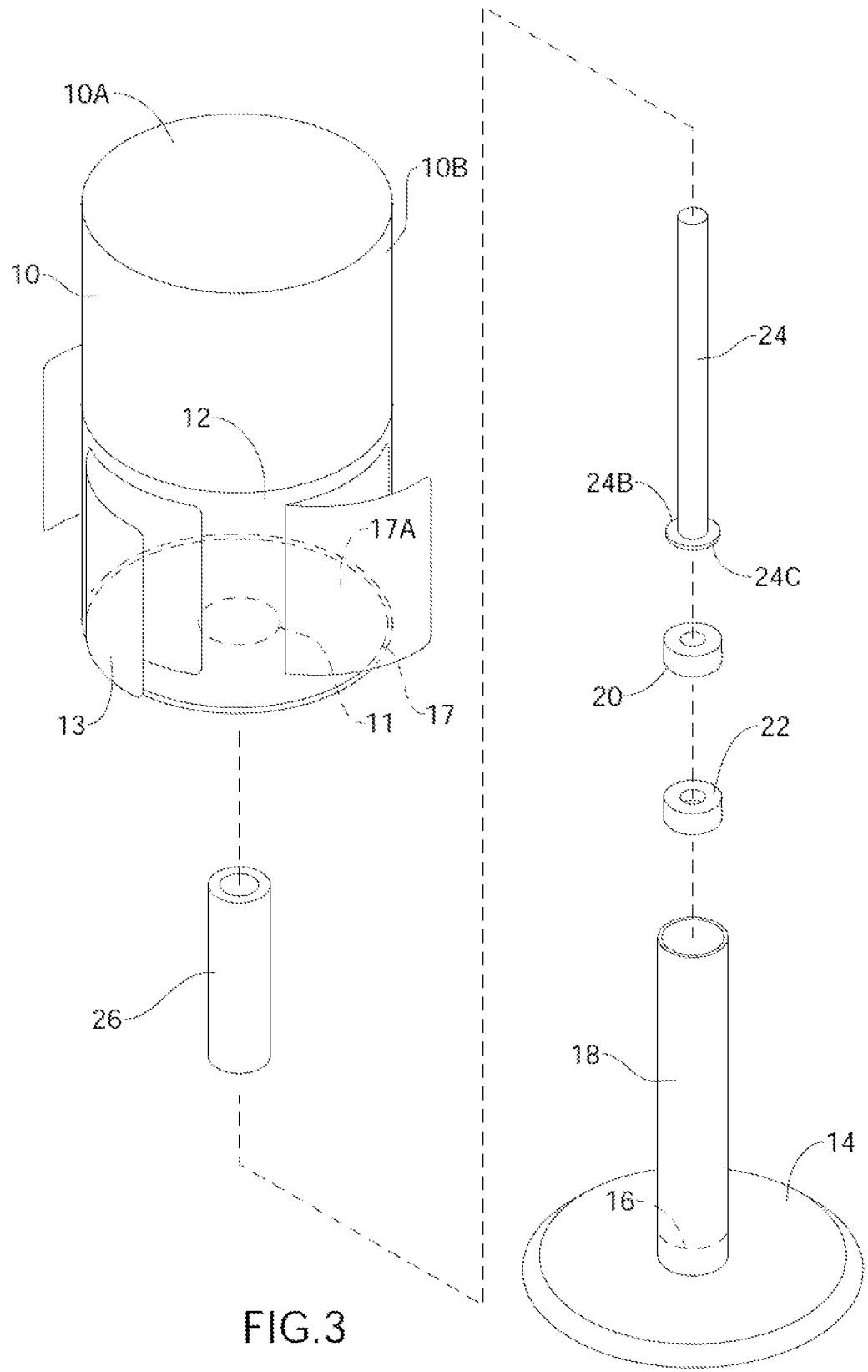
FIG. 3 is an exploded view of the spinning device.

In one embodiment as best depicted in FIGS. 3, 4 and 6, retainer assembly 19 may comprise an outer tubular post 18 (also referred to as "first tubular post") which extends upwardly from post base 16 and which is open at its top end. Outer tubular post 18 may have an inner diameter which is slightly larger than an outer diameter of magnets 20, 22 such that the magnets may be snuggly retained within the outer post. However, in an alternate embodiment, lower magnet 22 may be configured to tightly fit within outer tubular post 18 (and may have a diameter larger than that of upper magnet 20), such that it may held in place by friction to prevent it from flipping over. In some further embodiments, retainer assembly 19 may comprise an inner tubular post 26 (also referred to as "second tubular post") having an outer diameter which is slightly smaller than the inner diameter of outer post 18 and an inner diameter which is slightly larger than the main diameter of rod 24, but smaller than the diameter of stop disc 24C. In certain embodiments, tubular post 26 may be nested within and permanently attached to an inner side of outer tubular post 18. As such, rod 24 fits snuggly within inner post 26 and can freely rotate and slide vertically up and down within inner post 26. Additionally, the wider diameter of stop disc 24C provides a stop that prevents the bottom end of the rod from sliding past the bottom end of inner post 26. This further defines an enclosed chamber 19A between the bottom end of inner post 26 and a top end of post base 16 that retains magnets 20, 22. Thus, retainer assembly 19 maintains the components of spinning device 100 in functional position and in an assembled state. The opposing polarities of magnets 20 and 22 creates a repulsing magnetic force 42 which suspends rod 24 together with blade assembly 50 in mid-air, thus enabling rod 24/blade assembly 50 to spin in a nearly frictionless manner when blades 13 are exposed to wind, breeze, or other light torquing force. Additionally, the vertical freedom of movement enables the rod and blade assembly to lift while spinning (see FIG. 6).

It shall be appreciated that in alternate embodiments, any outward radial extension of the rod may serve as a stop against an upper radial blockage within outer tubular post 18. For example, disc 24C may be omitted, and upper magnet 20 (having a diameter larger than that of the rod) may itself serve as a stop against the bottom end of inner post 26.

Figure 10:
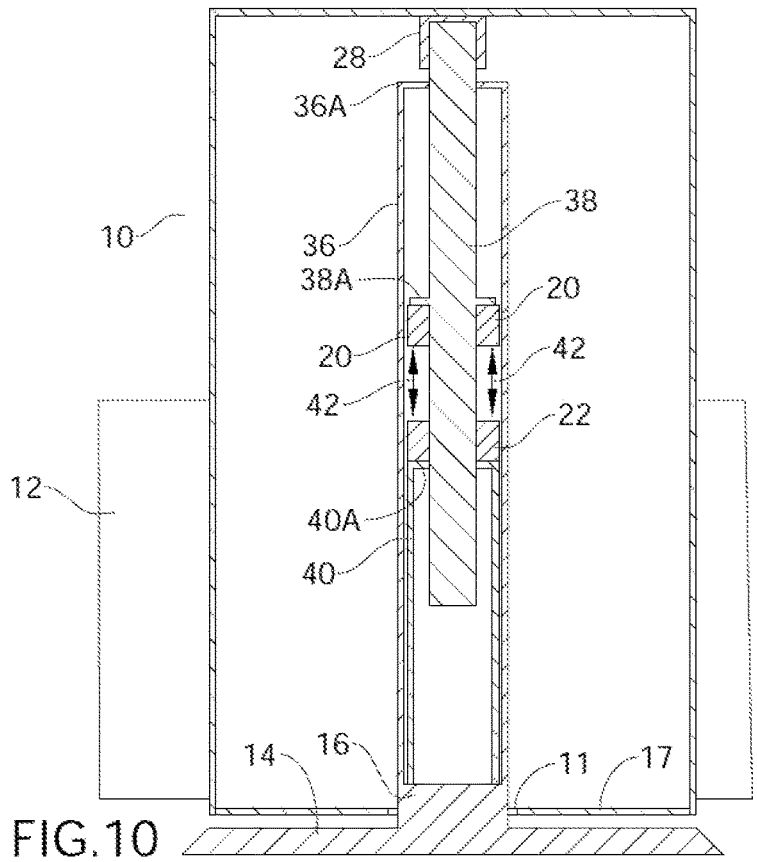
FIG. 10 is a section view of another alternate embodiment of the spinning device.

In another example as depicted in FIG. 10, an alternate rod 38, similar to rod 24, may include an intermediate stop disc 38A which is similar to stop disc 24C but located between upper and lower ends of the rod. In this configuration, upper magnet 20 may be attached to a bottom side of stop disc 38A and lower magnet 22 may be supported and/or coupled to the top end of an inner tubular post 40 below upper magnet 20. Inner tubular post 40 may include an opening 40A through which alternate rod 38 may engage and may itself be supported on top of post base 16. Additionally, an outer tubular post 36 may extend upwards from post base 16 around inner tubular post 40, and is configured to snuggly retain upper magnet 20 such that upper magnet 20 along with rod 38 may freely spin and slide up and down within inner tubular post 40 and outer tubular post 36. Outer tubular post 36 may further comprise an upper wall 36A ("upper post wall") extending inwardly from the side wall of the post. Upper wall 36A may include an opening sized to allow the rod to slide up and down through the post, and further provides a retaining stop against stop disc 38A to prevent rod 38 from disengaging and maintain the components of spinning device 100 in an assembled and functional state.

In an alternate embodiment, a washer or stabilizing ring 17A may be provided as an optional element within spinning device 100. Stabilizing ring 17A is depicted in FIG. 3 as an optional element for use with a hollow body having a bottom wall, but may also be used with a hollow body that does not have a bottom wall. In one embodiment, stabilizing ring 17A may be attached to the inner side of side wall(s) 10B or to another spinning component such as an exposed part of the rod. In another embodiment, stabilizing ring 17A may be attached to a non-spinning component such as an outer side of the outer tubular post (18 or 36). In some embodiments, stabilizing ring 17A may extend radially from around side wall(s) 10B to the rod or non-spinning component. However, different radial lengths may be employed in alternate embodiments. According to various embodiments, stabilizing ring may be used instead of or in conjunction with bottom wall 17 and may serve to increase the moment of inertia and/or prevent hollow body 10 from wobbling as it spins. Where a bottom wall is omitted, ring 17A may also serve to as a bottom enclosure. In some embodiments, ring 17A may be made of a bendable material allowing it to be inserted within a hollow body having a small opening, such as a soda can (see FIG. 9). It shall be appreciated that in certain embodiments, spinning device 100 may omit both the bottom wall 17 and stabilizing ring 17A.

In some embodiments, the components of spinning device 100 may be permanently attached, which may provide an added advantage of preventing children from accessing the magnets. In other embodiments, some or all of the components may be configured for permanent or non-permanent assembly by a user.

It shall be appreciated that spinning device 100 may be configured for different uses in alternate embodiments. In one embodiment, spinning device 100 may be configured as a vertical wind turbine electrical generator (such as a Savonius turbine). In such configuration, spinning device 100 may incorporate an electrical turbine motor and/or other components as known in the art for conversion, storage, and/or use of wind energy.

Figure 9:
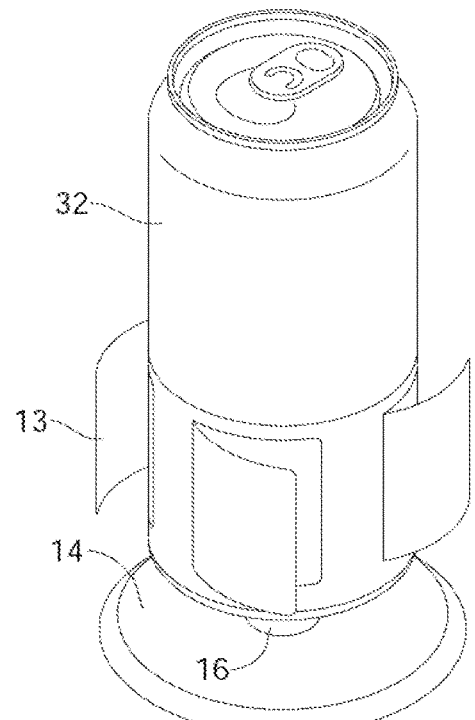
FIG. 9 is a perspective view of an alternate embodiment of the spinning device.

In another configuration, spinning device 100 may be configured as an amusement item, such as an art piece or construction toy. In one such embodiment, hollow body 10 may be a common household container, such as a soda can 32 as depicted in FIG. 9, oatmeal can, water bottle of various sizes, and other beverage containers, and the like. Such containers (i.e., bottles) may have a narrow neck and/or cap for a twist on or snap on bottom wall. Additionally, a user may be provided with a kit that includes some or all of the components necessary to construct spinning device 100.

It shall be appreciated that the components of device 100 may comprise any alternative known materials in the field and be of any size and/or dimensions. In certain embodiments, components of blade assembly 50 and/or retainer assembly 19 may be made of cardboard, plastic, metal, and the like. Such components may further be non-magnetic and/or configured to not interfere with the functionality of the levitation assembly. It shall be appreciated that the components of device 100 may be manufactured and assembled using any known techniques in the field. Furthermore, the components of device 100 may be provided as an assembled unit and/or as a kit for assembly by the end user, according to alternate embodiments.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:
1. A spinning device, comprising:
a wind blade assembly including a generally hollow body supporting a plurality of blades;
a rod configured to support the wind blade assembly; and
a magnetic levitation assembly configured to support the rod,
wherein the hollow body comprises an upper wall and a side wall extending downwards from the upper wall and defining a hollow enclosure between a bottom surface of the upper wall and an inner surface of the side wall, wherein the rod is coupled to a center of the upper wall to provide a rotational axis for the wind blade assembly, wherein the plurality of blades are coupled to an outer surface of the side wall and are configured to cause the hollow body to spin via a torquing force applied to the blades, wherein the magnetic levitation assembly comprises an upper magnet coupled to the rod below the upper wall, wherein the magnetic levitation assembly further comprises a lower magnet positioned below the upper magnet in repelling polarity to the upper magnet, the magnetic levitation assembly being configured to levitate the rod and wind blade assembly via a repelling force between the upper magnet and the lower magnet.

2. The spinning device of claim 1, further comprising a retainer assembly configured to retain the rod in vertical alignment and in a levitated state, while allowing the rod to freely spin.

3. The spinning device of claim 2, wherein the retainer assembly is further configured to retain the upper and lower magnets in a repelling alignment.

4. The spinning device of claim 3, the retainer assembly comprising a first tubular post which is opened at its top end and extends upwardly from a post base on which the lower magnet is supported, wherein the rod is engaged through the first tubular post such that it may move up and down as well as spin within the first tubular post.

5. The spinning device of claim 4, further comprising a stop member extending radially outwards from the rod, the retainer assembly further comprising a block positioned above the stop member and configured to prevent the stop member from sliding upwards past the block, such that the rod is prevented from disassembling from the retainer assembly.

6. The spinning device of claim 5, the stop member comprising a disc extending radially outwards from a bottom or intermediate section of the rod, wherein the upper magnet is coupled to a bottom end of the disc.

7. The spinning device of claim 6, the block comprising a second tubular post having a diameter smaller than the diameter of the first tubular post and nested within the first tubular post, wherein the rod fits snuggly within the second tubular post, and wherein a top surface of the disc is configured to impact against a bottom surface of the second tubular post as the rod is moved upwards, to prevent the disc from moving past the second tubular post.

8. The spinning device of claim 6, the block comprising an upper post wall extending radially inwards from a side wall of the first tubular post, the upper post wall including an opening with a diameter larger than that of the rod, the upper wall further configured to impact against a top surface of the disc as the rod is moved upwards to prevent the disc from moving past the upper post wall.

9. The spinning device of claim 8, further comprising a second tubular post having a diameter smaller than the diameter of the first tubular post and nested within the first tubular post, wherein the second tubular post is supported on the post base, and wherein the lower magnet is supported atop the second tubular post, the second tubular post further comprising an opening through which the rod is engaged.

10. The spinning device of claim 1, wherein the upper and lower magnets are disc rings.

11. The spinning device of claim 1, wherein the upper and lower magnets are neodymium magnets.

12. The spinning device of claim 1, wherein the hollow body include a bottom wall extending inwardly from a bottom edge of the side wall.

13. The spinning device of claim 1, wherein the hollow body is a cylindrical tube, drum, and/or can.

14. The spinning device of claim 1, wherein the blades are a components of a blade belt that is attached to and extends around side wall of the hollow body.

15. The spinning device of claim 1, wherein the blades are Savonius-type turbine blades.

16. The spinning device of claim 1, wherein the spinning device is a vertical wind turbine.

17. The spinning device of claim 1, wherein the spinning device is an amusement item.

18. The spinning device of claim 1, further comprising a stabilizing ring within the hollow body.

* * * * *